United States Patent [19]

Doherty et al.

[11] 3,958,109

[45] May 18, 1976

[54] UNIVERSAL MODULARIZED DIGITAL CONTROLLER

[75] Inventors: Donald W. Doherty, San Diego; Elbert J. Wells, Jr., Del Mar, both of Calif.

[73] Assignee: The United States of America as represented by the Secretary of the Navy, Washington, D.C.

[22] Filed: Jan. 20, 1975

[21] Appl. No.: 542,485

[52] U.S. Cl. .......................... 235/151; 235/61.5 E; 235/150.1; 318/569
[51] Int. Cl.² .................................... G06F 15/46
[58] Field of Search ............ 235/151, 151.1, 151.11, 235/150.1, 61.5 R, 61.5 E, 150.5; 340/172.5; 318/569, 590, 591, 574

[56] References Cited
UNITED STATES PATENTS

| | | | |
|---|---|---|---|
| 3,576,978 | 5/1971 | Rosenberg | 235/151.11 |
| 3,624,371 | 11/1971 | Neal et al. | 235/151.11 |
| 3,701,888 | 10/1972 | McDaniel | 235/151.11 X |
| 3,783,253 | 1/1974 | Anderson et al. | 235/151.11 |
| 3,878,983 | 4/1975 | Hamill et al. | 235/151.11 |

*Primary Examiner*—Joseph F. Ruggiero
*Attorney, Agent, or Firm*—R. S. Sciascia; G. J. Rubens; H. Fendelman

[57] ABSTRACT

A modularized digital controller which serves as a means of achieving dynamic compensation and also acts as an interfacing device in a closed-loop digital servo-control configuration. The controller incorporates four functional modules, the first of which is designed for the particular type of system being controlled and the remaining three being identical for all systems. A nonlinear or course control mode is employed during the period of synchronization to large input commands from a master source and, after the system dynamic error has been reduced to a nominal size, a linear control algorithm is used.

7 Claims, 21 Drawing Figures

FROM 96 LSC FF
FROM 136 SLAVE CP 1
FROM 136 SLAVE CP 2
FROM 136 SLAVE CP 3
TO 50 CLEAR A.U.
FROM 172 SELECT $2^0$
FROM 172 SELECT $2^1$
FROM 172 SELECT $2^2$
TO 182 SHIFT RIGHT CP
FROM D E(n) CP
FROM H LSC CP
TO 52 DATA BUFFER CP
TO 52 En BUFFER CP
FROM 150 END LSC
FROM F START $\overline{V}(n)$
FROM 92 SSC FF
FROM 118 $\overline{V}(n)$ FF
TO 34b R(n)/C(n) CP
FROM J $\overline{V}(n)$ CP 13g

UNIVERSAL MODULARIZED DIGITAL CONTROLLER

BACKGROUND OF THE INVENTION

A problem frequently addressed by digital systems engineers is one in which an analog power drive must be controlled by position orders generated by a centralized or master digital computer. This is particularly true for military applications since many of what were previously all analog fire control systems are being converted to hybrid systems, i.e., a digital fire control computer sending commands to one or more analog power drives. Generally, when considering a hybrid application of this type, a primary concern should be that the master computer is not required to ouput position orders at an excessively high rate, thereby tying up valuable input-output time, particularly if the computer is required to serve more than one power drive at a time. Practical considerations of this nature generally limit the desirable sample rate of these orders to nominally 32 samples per second. However, at this relatively low rate, some difficulty may be encountered in maintaining smooth operation of the system. Studies have shown that to drive a conventional analog servo system of this type with a "raw" 32 samples per second signal, for example, would result in a very rough, if not violent, operation of the power drive resulting in premature component deterioration and an overall poor response. Other existing and proposed approaches to digital control, designed to perform a similar function, typically require sophisticated digital-to-analog interfacing equipment and a significant amount of analog hardware. The interface usually involves some type of data extrapolation scheme and includes provision for digital-to-synchro (or resolver) conversion; the objective of such a device usually being to modify the discrete, low sample-rate orders in such a fashion as to present them to the analog servo loop as a "quasi" continuous signal. These interfacing techniques, and especially the associated analog hardware, are generally particular to each system.

SUMMARY OF THE INVENTION

According to the present invention, applicant has discovered that sample rates of 32 samples per second, or less, are readily acceptable if the servo loop is closed digitally and the resulting digital error signal is operated on by suitable discrete control algorithms and the result applied to the power drive through an appropriate D/A converter. The controller of the present invention may provide digital compensation for as many as four independent axes; typically two two-axis systems or one three-axis system per sample period. The power drives applicable to the controller of the present invention are characterized by torque (acceleration) saturation. The control scheme used is based upon a dual mode of operation, i.e., a large signal or course control mode is used for large values of error to bring the plant to a nearly synchronized condition and a linear control algorithm is used in the relatively narrow, small signal region. After the appropriate conditioning of the signals received from the master source and scaling of the signals from plant position feedback devices, the controller operates to first select a mode of operation, either a course control mode for responding to large signal inputs or a small signal control mode for responding to signal errors less than a predetermined value. In the small signal control mode, a digital tachometer calculation is summed with error and the sum used in the computation of a small signal control algorithm utilizing predetermined constants dependent upon the particular plant being driven. This sum is then added to a feedforward velocity signal and the result is outputted to a D/A converter as a velocity signal for the plant. In the course control mode, the results of the calculation of a fourth order polynomial are added with the feedforward velocity signal and outputted to the D/A converter as the velocity signal for the plant.

The digital controller of the present invention is relatively insensitive to significant system parameter changes and has a response to large signal inputs which approaches the time optimal, exhibiting very little overshoot. It is applicable to a large class of power drives requiring only minor modification from one system to the next. Moreover, the controller of the present invention is readily manufacturable in a compact form, thus permitting it to be mounted in the proximity of the particular power driving controls. Off-the-shelf logic components may be used throughout, thus negating the requirement for high-risk, one of a kind circuits. Other advantages of the present invention are high tracking accuracies while maintaining smooth operation at a relatively low sample rate, the ability to control several axes of rotation, and inclusion of built-in test features thus eliminating the requirement for external devices, such as "dummy directors" to perform routine operational maintenance and fault isolation testing.

OBJECTS OF THE INVENTION

It is the primary object of the present invention to provide a novel means of controlling a broad class of analog power drives.

It is another object of the present invention to provide a novel analog power drive controller which is wholly digital and is universally applicable.

It is another object of the present invention to provide a novel timing and control circuit for a plant controller.

It is still a further object of the present invention to provide a novel temporary data storage device.

It is yet another object of the present invention to disclose a novel mode selection network.

It is an additional object of the present invention to disclose an analog power drive controller network which is self-testing with respect to coherency.

Other objects, advantages and novel features of the invention will become apparent from the following detailed description of the invention when considered in conjunction with the accompanying drawings.

BRIEF DESCRIPTION OF THE DRAWINGS

FIGS. 13a, 13b, 13c, 13d, 13e, 13f, 13g, and 13h are timing diagrams for implementing the algorithms and control functions of the present invention.

DESCRIPTION OF THE PREFERRED EMBODIMENTS

Figure 1:
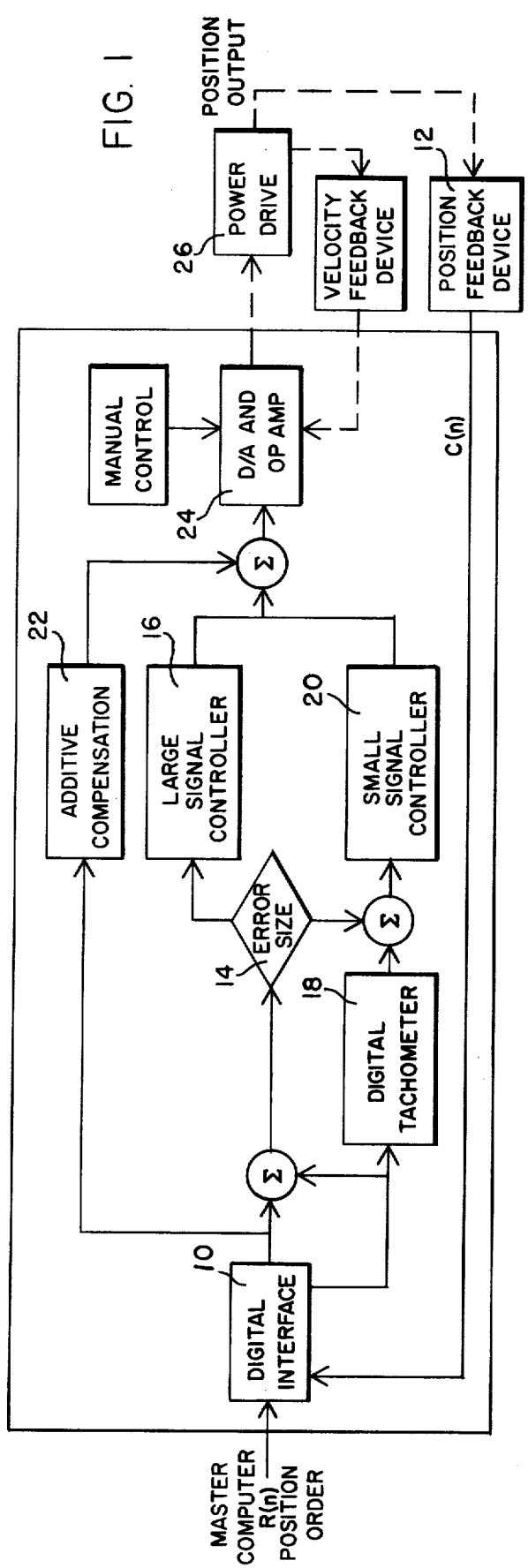
FIG. 1 is a functional diagram of the controller of the present invention.

FIG. 1 is a functional block diagram of the closed-loop control configuration of the present invention. Digital interface section 10 accepts periodic position commands $R(n)$ from the master computer. Typical word lengths are on the order of 16 bits each for train and elevation commands and may be either in series or parallel form, depending on the system requirements. Plant position $C(n)$ is furnished by a suitable position feedback device 12 to digital interface 10 where the position data is converted to logic levels appropriate for the controller. $C(n)$ is compared with $R(n)$ to determine the position error at item 14. If the error is greater than a first predetermined value, a course or large signal control mode is implemented by the large signal controller 16. If the error is less than the predetermined value, a digital tachometer calculation 18 is performed and is summed with error and the results subsequently used in a small signal control computation 20. The result of either the large signal control or the small signal control computation are added with an additive compensation (feedforward velocity) computation indicated at 22. The resulting digital velocity signal is converted to an analog signal by unit 24 which drives the plant power drive 26.

The four functions that must be performed, i.e., small signal control, large signal control, additive compensation, and digital tachometer, require the solution to four algorithms. The small signal control algorithm that has to be calculated is:

1. $\bar{E}(n) = a_0 \hat{E}(n) + a_1 \hat{E}(n-1) + a_2 \hat{E}(n-2) + b_1 \bar{E}(n-1) + b_2 \bar{E}(n-2)$ where $a_0, a_1, a_2, b_1$, and $b_2$ are constants; $\hat{E}(n) = E(n) + \bar{C}(n)$ where $E(n)$ is the present value of error and $\bar{C}(n)$ is defined below; $\hat{E}(n-1)$, and $\hat{E}(n-2)$ are past values of $\hat{E}(n)$; and $\bar{E}(n-1)$, and $\bar{E}(N-2)$ are past values of the small signal control algorithm. The large signal control algorithm requires the on-line solution of a fourth order polynomial of the form 2. $V_c(n) = \{[(C_4 E(n) + C_3) E(n) + C_2]E(n) + C_1\} E(n) + C_0$ where $c_0, c_1, c_2, c_3$, and $c_4$ are constants. The algorithm used to obtain the additive compensation (feedforward velocity) is similar in form to the one for the small signal control. The equation is:

3. $\bar{V}(n) = K_1 R(n) - K_1 R(n-1) + K_2 \bar{V}(n-1)$ where $\bar{V}(n)$ and $\bar{V}(n-1)$ are present and past values of the feedforward velocity; $R(n)$ and $R(n-1)$ are present and past values of position order; and $K_1$, and $K_2$ are constants. The digital tachometer calculation that is performed is:

4. $\bar{C}(n) = A [C(n) - C(n-1)]$ where $\bar{C}(n)$ is the result of the digital tachometer calculation; $C(n)$ and $C(n-1)$ are present and past values of plant position, and A is a constant.

Figure 2:
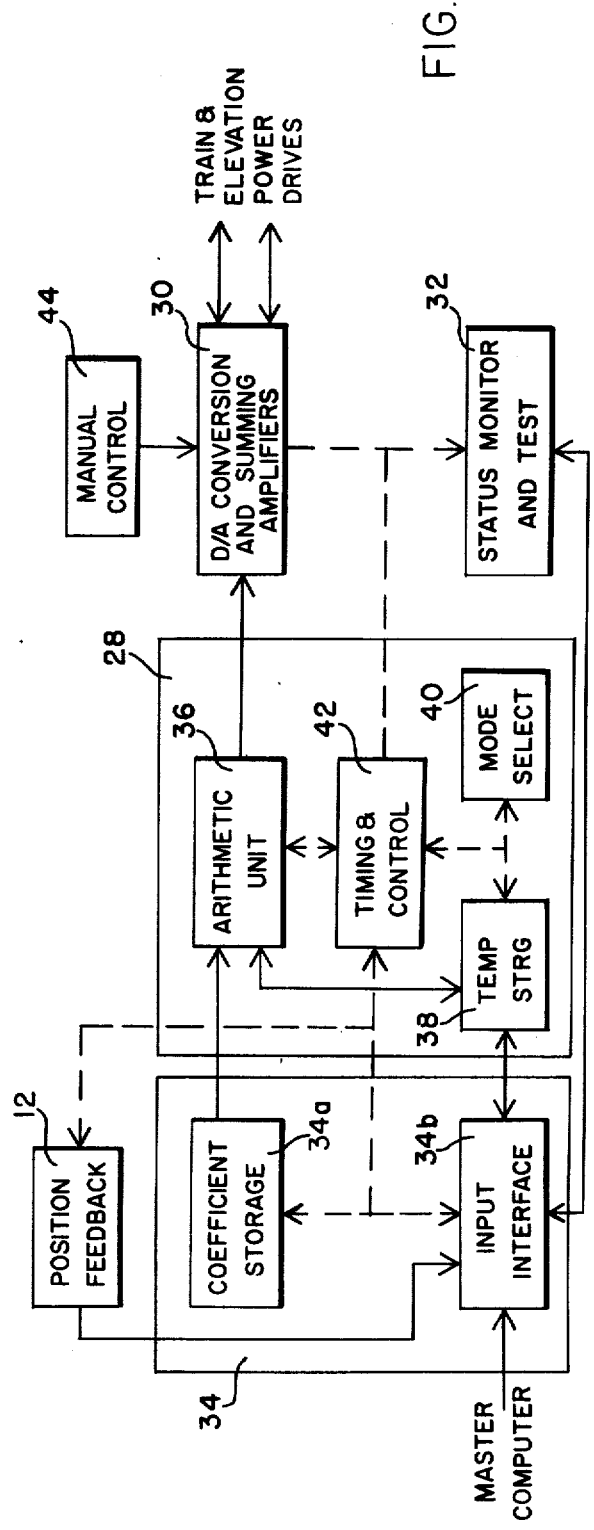
FIG. 2 is a block diagram of the four modules of the present invention.

The device for implementing the functions illustrated in FIG. 1 is illustrated in block form in FIG. 2. The controller has been implemented in four modules. The processor module 28, the analog output module 30, and the status test module 32 are identical for all systems applicable to this design. The coefficient/interface module 34 which includes coefficient storage section 34a and interface section 34b is, in general, unique for each system since a unique set of constants will be required for each particular plant. The processor module 28 is the heart of the minicontroller of the present invention. It contains the arithmetic unit 36, the temporary storage unit 38, the mode select network 40, and the timing and control network 42. The arithmetic unit is capable of addition, subtraction, and multiplication of two $n$-bit numbers, where $n$ in the illustrated embodiment is 24. It is to be understood, however, that a different number of bits could be used if desired. Temporary storage 38 is designed to store past and/or present values of error, position order, small signal control calculations, large signal control calculations, actual plant position, feedforward velocity, and digital tachometer calculations. The mode select circuitry 40 selects either the small or large signal control modes of operation. A small signal control mode is selected if the absolute value of error is less than ½°, or if it is less than 1° and the small signal control mode had been utilized in the previous iteration. The large signal control mode is selected if the absolute value of error is greater than half a degree and large signal control had been the previous mode of operation. It is to be understood that different values of error may be used if desirable in the mode selection function. The timing and control unit 42 generates all the waveforms required to convert the position order received from the master source into the velocity signal required by the plant. The analog output module 30 converts the digital velocity signals from the processor module 28 into analog signals to drive the plant. The status/test module 32 monitors key system parameters and recognizes anomalies that occur during system operation. It also inputs selected test commands to verify that the complete system is functioning properly. The coefficient interface module 34 contains the memory required to store all the constants and the components necessary to convert the signals received from the master source and feedback devices into the serial inputs required by the processor module 28. Manual controls 44 may also be provided for direct control of the plant.

Figure 3:
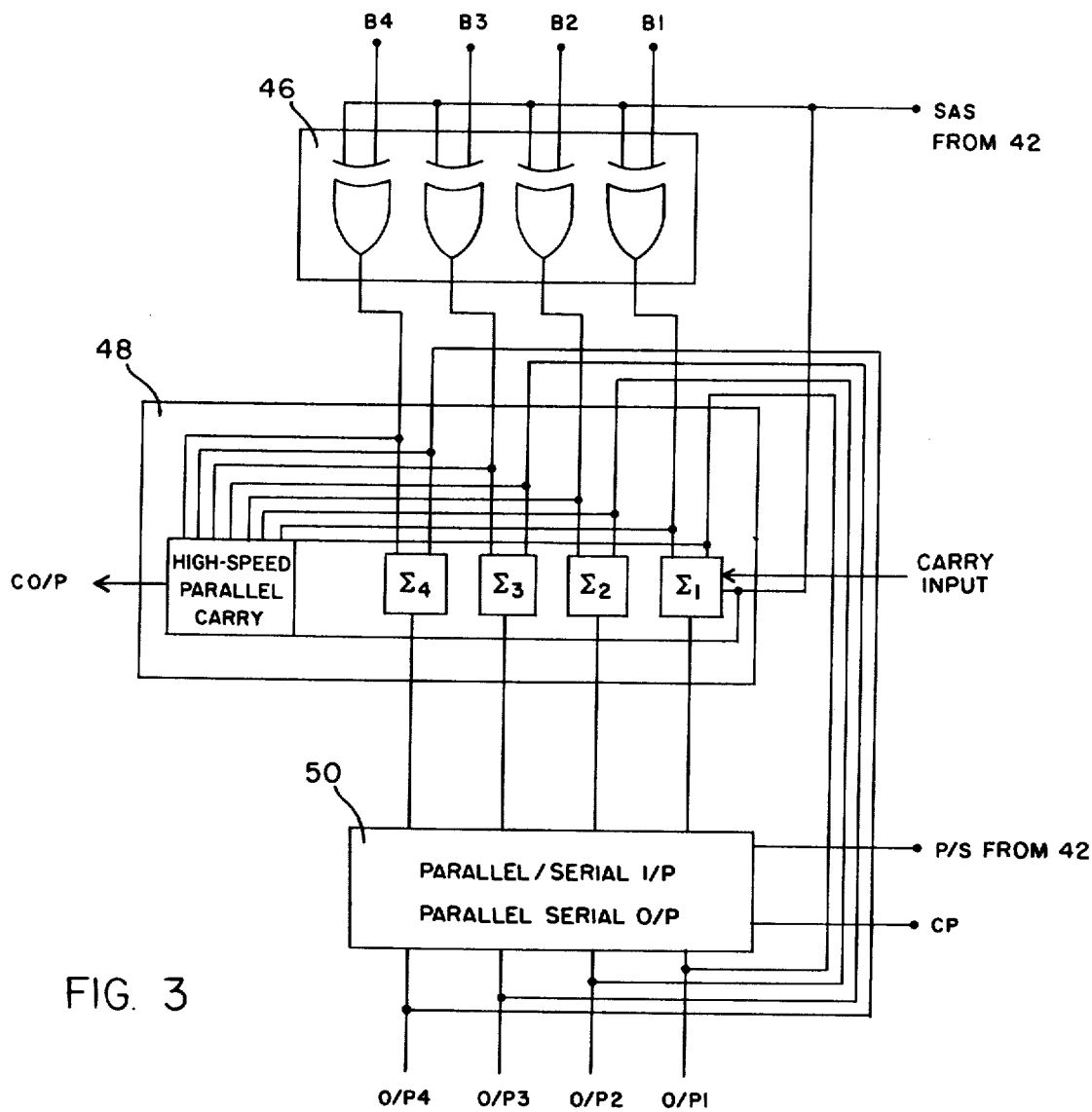
FIG. 3 is a block-schematic diagram of the arithmetic unit of the present invention.

A network diagram of the basic arithmetic unit is illustrated in FIG. 3. For a 24-bit capacity six of the four-bit subsystems illustrated in FIG. 3 would be cascaded together to form the required 24-bit unit. The arithmetic unit is comprised of three different components, a quad exclusive-OR gate 46, a four-bit full adder 48, and a four-stage parallel in/parallel out shift register 50. The exclusive-OR gates 46 receive the inputs to the arithmetic unit and the Subtract/Add Select line (SAS) from the timing and control network 42. The inputs B1, B2, B3 and B4 come from either the coefficient storage section 34a of the coefficient/interface module 34 or the data buffer register in the temporary storage unit 38 described below. The SAS line is used to complement the inputs when subtraction is being performed. If the SAS line is a logic 0, the true value of the input are transmitted to the adder and addition is performed. If the SAS line is a logic 1, the complemented values of the input are transmitted to the adder and subtraction takes place. The SAS line is also tied to the carry input of the lowest order adder. The inputs to the full adder 48 include the 4 sets of bits to be added and the carry-in bit from the previous cascaded stage. The outputs include the four sum bits and the carry-out bit to the next stage. The parallel in/parallel out shift register 50 receives the outputs from the adders if the parallel/serial line (P/S) derived from the timing and control network 42 is high. If the P/S line is low data is shifted one place to the right per clock pulse. The highest order output bit is tied to its own serial input and insures that the sign bit does not change during shifting. The outputs of the register are tied to the storage registers located in the temporary storage unit 38 and the analog output module 30.

Figure 4:
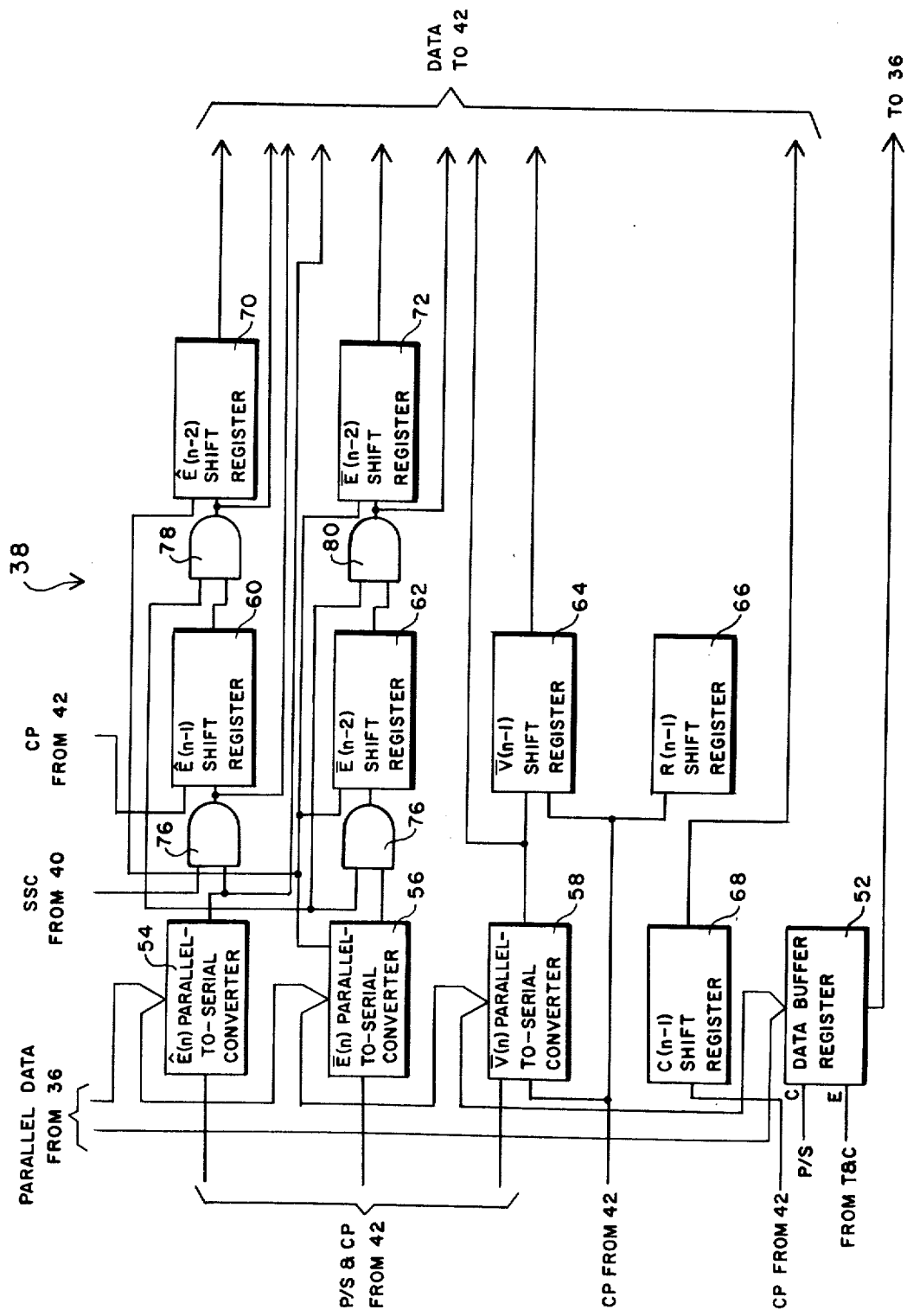
FIG. 4 is a network diagram of the temporary storage means of the present invention.

The network diagram of the temporary storage unit 38 is illustrated in FIG. 4. As stated above, temporary storage is used to hold past and/or present values of position command, plant position, error, small signal control calculations, large signal control calculations, and additive compensation calculations. Parallel data to this unit comes from the arithmetic unit 36. At various times this data represents error $E(n)$, the sum of error and digital tachometer calculations, the small signal controller results $\overline{E}(n)$, and the intermediate and final results of the large signal control calculations $V_c(n)$. Serial data is transmitted to 38 from the interface module 34 and is either position order or plant position data.

The data buffer register 52 may be comprised, for example, of two eight-stage bidirectional parallel/serial input/output bus registers. The enable input can disable the outputs of the register and allow the data to be fed to a common bus that is shared with the storage devices of the coefficient/interface module 34. Position command data is serially shifted into these registers when the plant position information is being scaled. The outputs of these registers are then enabled and error is calculated in the arithmetic unit 36. The outputs of these registers are also enabled when the large signal control algorithm is being calculated, when digital tach is being summed with error, and when small or large signal control is being transmitted to the analog output module 30. The parallel-to-serial registers 54, 56, and 58 are used to hold $\hat{E}(n)$, small signal control results $\overline{E}(n)$, and additive compensation results $\overline{V}(n)$, respectively. These devices are, for example, eight-stage parallel input/serial output registers sharing common clock and parallel/serial (P/S) control lines. When the (P/S) line is high, parallel data is entered into these registers from the arithmetic unit 36. This data is serially shifted out when the P/S line is low. Shift registers 60, 62, 64, 66, and 68 are used to store past values of error, small signal control calculations, additive compensation calculations, position commands, and plant position, respectively. Shift registers 70 and 72 are used to store second past values of $\hat{E}(n)$ and small signal control computations, respectively. AND gates 74, 76, 78, and 80 illustrated in FIG. 4 are used to load the registers 60, 62, 70, and 72 with the desired data when small signal control is selected. If large signal control is selected, 0's are automatically shifted into these registers. This guarantees that small signal control is always entered with zero initial conditions.

Figure 5:
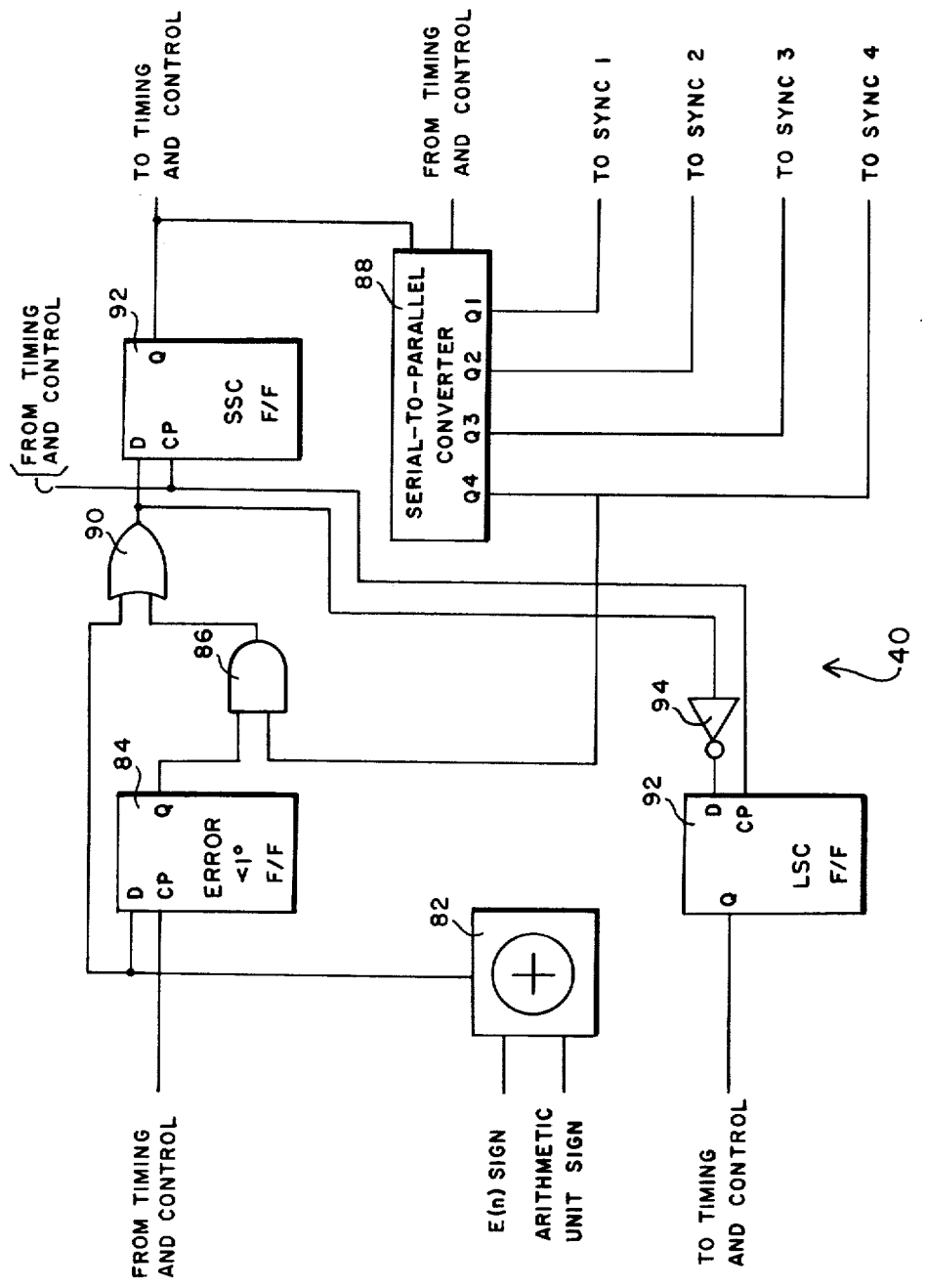
FIG. 5 is a network diagram of the mode selection means of the present invention.

The mode select circuitry is illustrated in FIG. 5. Small signal control is selected if the error is less than ½° or if the error is less than one degree and small signal control had been selected the previous sample. The first step that is performed is that the error $E(n)$ is compared with one degree in the arithmetic unit 36. At the proper time, as dictated by timing and control 42, 1° is subtracted from the error $E(n)$. Exclusive OR gate 82 receives an $E(n)$ Sign input from the output of AND gate 74 in the temporary storage unit 38 and an Arithmetic Unit Sign input from the most significant bit (0/P4) in the arithmetic unit 36. If the error is less than 1°, the output of the exclusive-OR gate will be a logic 1. This will cause the Error < 1° flip-flop 84 to go high. The output of flip-flop 84 is ANDed with the mode that had been selected the previous sample period by AND gate 86. The previous sample periods mode had been stored in a four-bit serial/parallel register 88. The next step performed is the comparison of error $E(n)$ with half a degree. The output of the exclusive-OR gate 82 will be a logic 1 if the error is less than half a degree. This output is OR'd with the output of the AND gate 86 and OR gate 90 and the SSC (small signal control) flip-flop 92 will go high if either condition is met when the clock pulse goes high. If neither condition is met, the output of OR gate 90 will be a logic 0 which 0 is inverted by inverter 94 such that the LSC (large signal control) flip-flop 96 will go high to signify the selection of large signal control.

Figure 12:
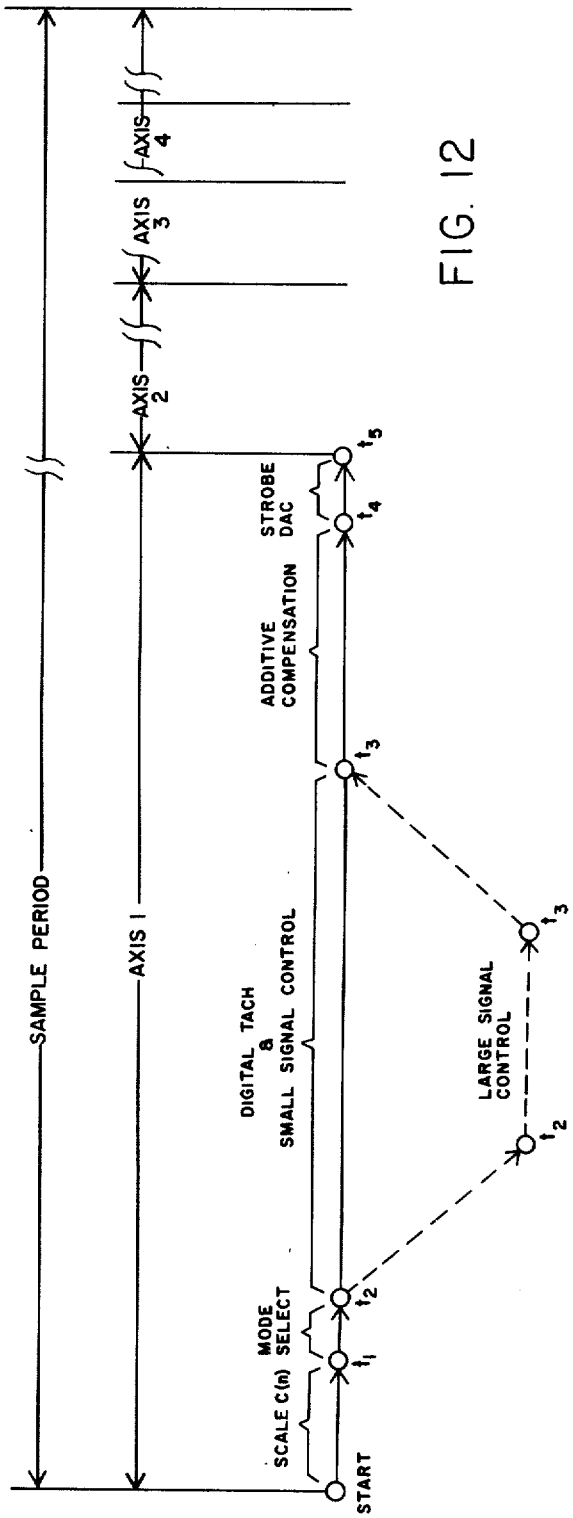
FIG. 12 is a functional timing diagram of the operations of the present invention.

The timing and control sequence described below is functionally illustrated in FIG. 12. The controller receives the start pulse from the master computer at the predefined sample rate. Along with the start pulse, the computer transmits the position orders $R(n)$ for all axes being controlled. Position feedback $C(n)$ is also strobed into the controller with the start pulse. Since the signal format and/or logic levels of $E(n)$ and/or $C(n)$ may not be directly compatible with the controller hardware, interfacing is usually required to convert all inputs into the desired format and logic levels as will be described below. Since $C(n)$ is supplied from an off-the-shelf component with defined characteristics, scaling may be required to make the $C(n)$ data match the coding of the $R(n)$ data. After $C(n)$ has been scaled, it is subtracted from the $R(n)$ to form error $E(n)$. The size of this error is compared to stored values in the coefficient storage section of the coefficient/interface module 34 which in the present embodiment is comprised of ROM's (read only memories) and the mode of operation is selected. This dual mode control is used because the power drives are characterized by torque (acceleration) saturation. If large signal control is selected, the on-line solution of the fourth order polynomial set forth in equation (2) is performed. The switching curve defined by this polynomial controls the plant deceleration at a predetermined rate. If small signal control had been selected, the small signal control algorithm set forth in equation (1) is solved instead of large signal control. The small signal controller is a linear discrete biquadratic lag but is not limited to a lag compensator. Any appropriate linear compensation of this form can be implemented if desired. The small signal control algorithm is a function of the sum of error and digital tachometer calculations; whereas only error is utilized in the large signal control calculations.

The results of either calculation is stored in temporary storage 38 for later use. The next function that is performed is the solution of the additive compensation equation (3). The purpose of this function is to provide improved system accuracy without affecting stability. The result of this calculation is stored for future use and is summed with the stored small or large signal control results. This sum is then strobed into the D/A converter 30 where the generated digital order is converted into the analog signal required by the power drive. After the D/A converter 30 has been strobed, an internal starter pulse is generated in the controller to start the same sequence of operation for the next axis to be controlled. The timing sequence is repeated four times and then the controller goes into the idle mode until receipt of the next external start from the master computer.

Figure 6:
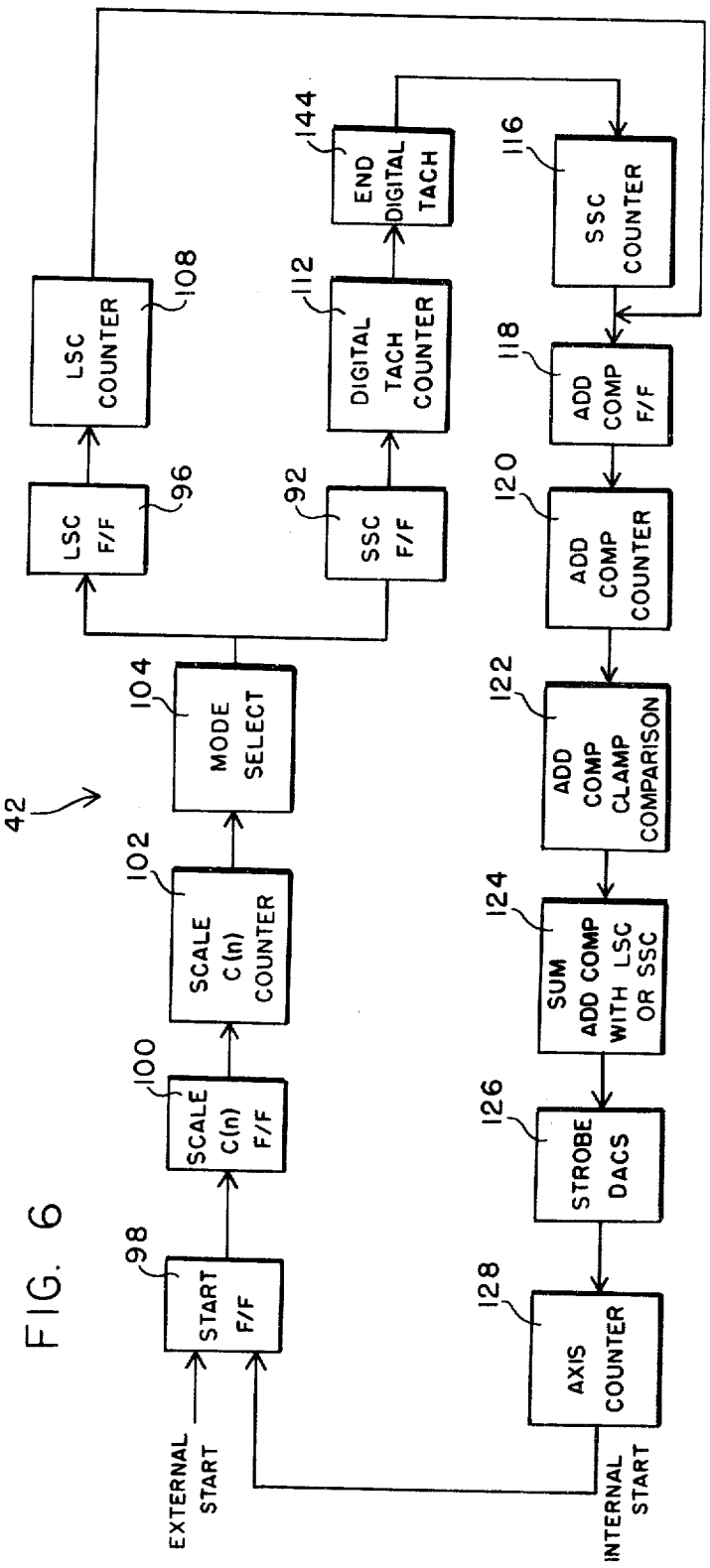
FIGS. 6, 6a, and 7 are network diagrams of the timing and control means of the present invention.

Referring now to FIG. 6 which is a block diagram of the timing and control unit 42, it is seen that the external start from the master computer sets the flip-flop 98 to begin the controller operations. The output of flip-flop 98 sets the scale $C(n)$ flip-flop 100 and begins the scaling of $C(n)$. When the output of the scale $C(n)$ counter 102 goes high, the scaling has been completed and the scaled value of $C(n)$ is in the arithmetic unit 36. Mode select section 104 then begins by initiating subtraction of $C(n)$ from $R(n)$ in the arithmetic unit 36 to form error $E(n)$. This value of error is compared to predetermined values (1° and 1/2°) stored in the coefficient storage section of 34. If the error was found to be outside the range for small signal control selection, the LSC flip-flop 96 is set and the large signal control algorithm is calculated in the arithmetic unit 36. The output of the LSC counter 108 goes high when the calculation has been completed, and the result is stored in temporary storage 38. If the error was in the small signal range, the SSC flip-flop 92 is set, and the digital tach algorithm defined in equation (4) is solved by the arithmetic unit 36. When the output of the digital tach counter 112 goes high, the digital tach calculation is added to error and the End Digital Tach flip-flop 144 is set. The small signal control algorithm defined in equation (1) is now solved. The output of the small signal control counter 116 signifies the completion of the calculations and the storing of the computation in temporary storage 38. The additive compensation flip-flop 118 is set at the completion of the large or small signal control calculations. The setting of this flip-flop indicates the beginning of the additive compensation calculations. When the additive compensation counter 120 goes high, the results of the calculation are in the arithmetic unit and additive compensation clamp comparison section 122 initiates comparison of the additive compensation value with a clamp value stored in the coefficient storage section of 34. If the value from the calculations by arithmetic unit 36 is less than the clamp value, the calculated value is stored in temporary storage 38. If the calculated value is greater than the clamp value, the clamp value is stored in temporary storage 38. The stored value of additive compensation is next added to the stored value of the small or large signal control calculations, which function is initiated by section 124. This sum is then strobed into the D/A converter 30 where it is converted into the analog signal required by the plant. This function is effectuated by section 126. The same strobe pulse is used to increment the axis counter 128 by 1. If the count in the counter is less than four, an internal start is generated to begin the sequence of operations for the next axis. When the count reaches four, no internal start is generated and the controller goes into the idle mode until the next external start from the master computer.

Figure 6A:
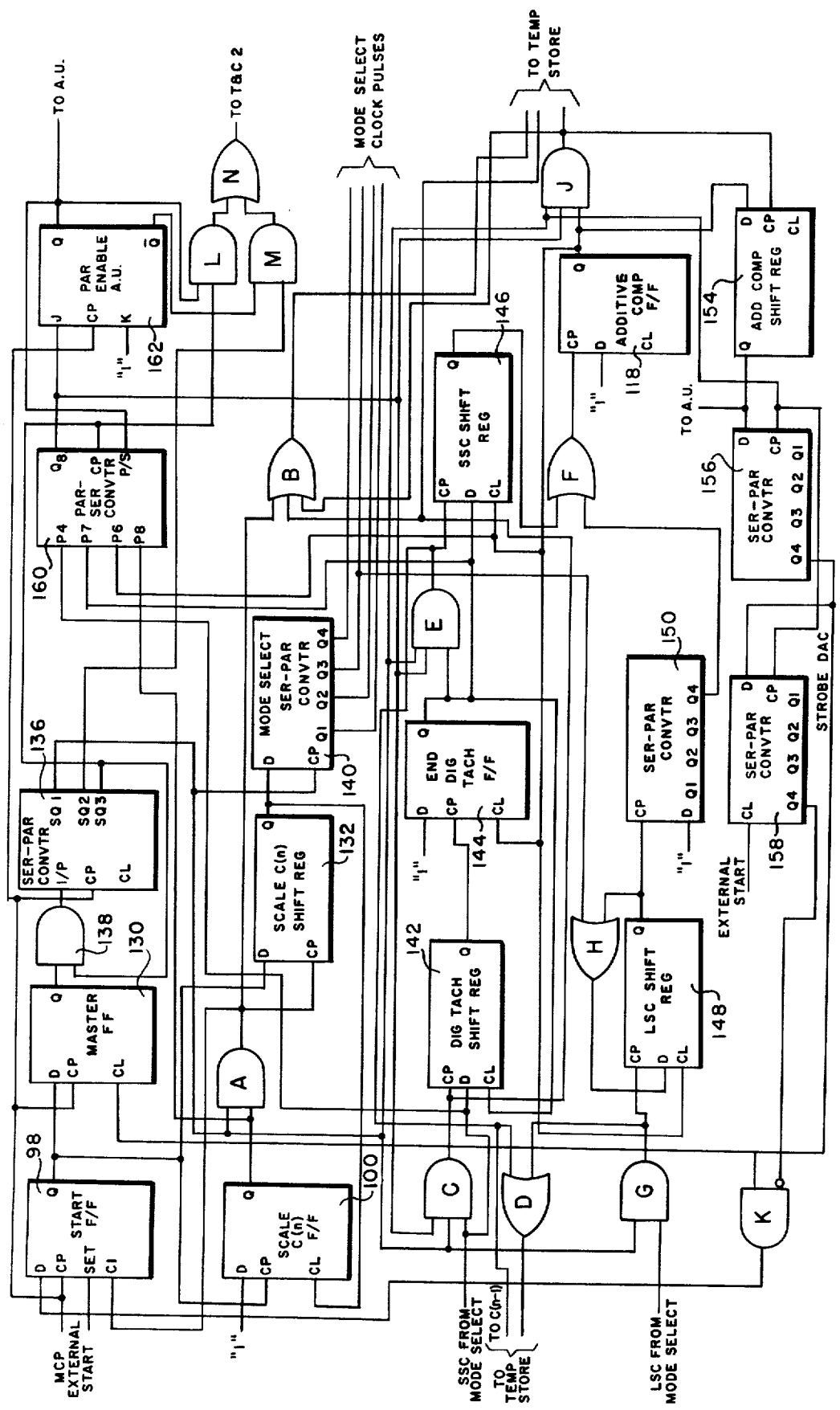
Figure 7:
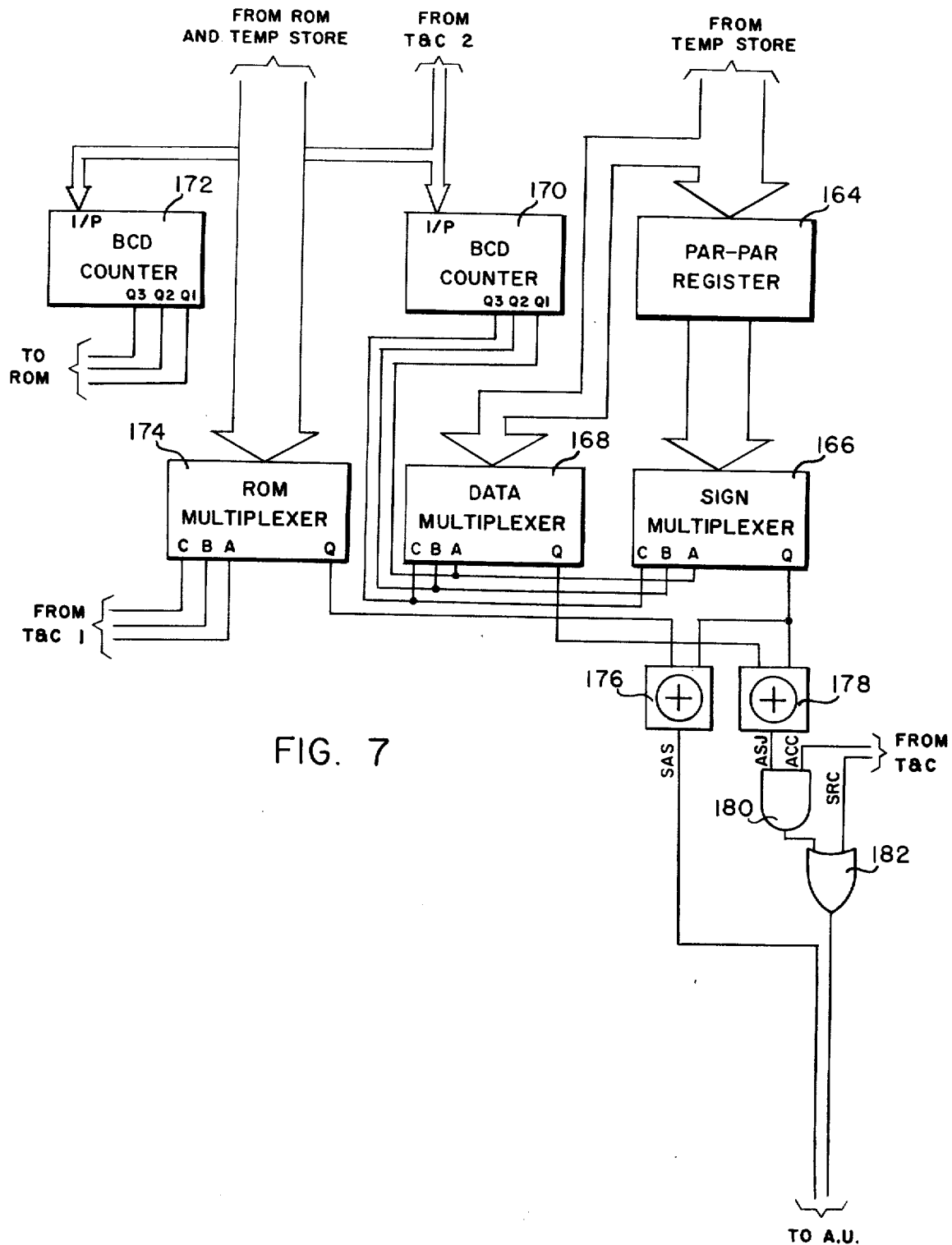

Details of the timing and control network 42 are illustrated in FIGS. 6a and 7. As previously stated, the external start pulse sets the controller's start flip-flop 98. The output of flip-flop 98 is tied to the input of the master flip-flop 130, the input of the scale $C(n)$ shift registers 132 and the clock pulse input of the scale $C(n)$ flip-flop 100. When the master flip-flop 130 goes high, the slave clock pulses (SQ1, SQ2, SQ3) are generated by serial-parallel converter 136 after ANDing by AND gate 138. SQ3 is used for regeneration of the sequence. The three slave clock pulses are used in generating all the internal timing and control signals. Clock pulse SQ1 is ANDed by gate A with scale $C(n)$ flip-flop 100 to generate clock pulses for the scale $C(n)$ shift register 132. The output of AND gate A is also used to clear the start flip-flop 98 and is one of the inputs to OR gate B whose outputs are the clock pulses for the $R(n)$ and $C(n)$ registers on the coefficient/interface module 34. The output of the scale $C(n)$ shift register 132 goes high when the scaling has been completed indicating to start mode selection. This output is tied to the mode select serial/parallel converter 140. Converter 140 output Q1 is the pulse used to calculate error by adding $R(n)$ to a negative $C(n)$. Converter 140 output Q2 is the clock pulse to the Error < 1° flip-flop 84 used in the 1° comparison. Converter 140 output Q3 is the clock pulse to the SSC flip-flop 92 and the LSC flip-flop 96. Mode select converter 140 output Q4 is used to store the mode selected.

If small signal control is selected, small signal control flip-flop 92 will be set. The output of 92 is the input to the digital tach shift register 142 and enables AND gate C. The output of C is the clock pulse to the digital tachometer shift register 142, and the clock pulse to the $C(n-1)$ shift register located in temporary storage 38. It is also tied to OR gate B. The output of the digital tach shift register 142 goes high after 16 clock pulses and sets the End Digital Tach flip-flop 144.

The output of End Digital Tach flip-flop 144 enables AND gate E and is the input to the small signal control shift register 146. The output of E is the clock pulse to the SSC shift register 146 and the $E(n-1)$, $E(n-2)$, $\overline{E}(n-1)$, and $\overline{E}(n-2)$ shift registers located in temporary storage 38. The output of E is also tied to the input of OR gate D. D's output is the clock pulse to the $E(n)$ shift register 54 located in temporary storage 38. After 24 clock pulses the output of the SSC register 146 goes high. The output of SSC shift register 146 is an input to OR gate F.

If large signal control had been the mode selected, AND gate G is enabled. The output of G is an input to gate D and the clock pulse for the large signal control shift register 148. The output of this 16-bit shift register is tied back to the input through OR gate H. After cycling through this register four times, the output of the LSC (large signal control) serial/parallel converter 150 goes high. The output going high signifies the completion of large signal control and is tied to the input of gate F. The additive compensation flip-flop 118 is set when gate F goes high. The output of this flip-flop enables AND gate J and is tied to the input of the additive compensation shift register 154. The output of gate J is tied to the input of gate B and is the clock pulse for the $\overline{V}(n)$, $\overline{V}(n-1)$, and $R(n-1)$ shift registers located in temporary storage and is also the clock pulse for the additive compensation shift register 154. The output of the additive compensation shift register 154 goes high after 16 clock pulses. This signifies the completion of the additive compensation calculations and the beginning of the clamp value comparison in the arithmetic unit 36. serial/parallel converter 156 counts four clock pulses to permit the clamp comparison. The Q4 output of 156 strobes the digital-to-analog converters in unit 30 and enables serial/parallel converter 158. The output of gate K is the internally generated start pulse. The inputs to this gate are the strobe DAC clock pulse and the output of 4-bit serial/parallel converter 158. Converter 158 is cleared by the external start pulse and is used to monitor the number of axes presently being controlled. As long as the output Q4 of the converter 158 is low, gate K is enabled and the internal start can be generated. When the Q4 output goes high, at the end of the fourth axis' calculation, gate K is disabled and the controller goes into the idle mode until the next external start is received.

Parallel/serial converter 160 is used to enable the generation of the shift right clock pulse. The inputs to this register are the SSC flip-flop 92, the end digital tach flip-flop 144, the additive compensation flip-flop 118 and the scale $C(n)$ flip-flop 100. When small signal control is selected, the shift right clock pulse is generated once for every five slave clock pulse two generations. When digital tach is selected, one shift right clock pulse is generated for every two slave clock pulse two generations. One shift right clock pulse is generated for every three slave clock pulse two generation when additive compensation is selected. A shift right clock pulse for every slave clock pulse two generations is generated when scale $C(n)$ is selected.

Gates L, M, and N are used to generate the clock pulses for the arithmetic unit. The output of AND gate L is the product of the slave clock pulse SQ3 from converter 136 and the parallel enable AU flip-flop 162. The output of AND gate M is the product of slave clock pulse SQ2 and the NOT parallel enable AU flip-flop 162 output.

The network diagram illustrated in FIG. 7 depicts the components used to generate the control signal to the arithmetic unit and the addresses for the ROM's in the coefficient storage section of the coefficient/interface module 34. Parallel-parallel register 164 holds the sign information for all the data that is stored in temporary storage 38. The outputs of this register are tied to the inputs of the sign multiplexer 166. Data from the temporary storage 38 is inputted to the data multiplexer 168. The data select lines of these multiplexers are tied to a BCD (binary coded decimal) counter 170 in order that the desired data and its corresponding sign are selected. Similarly, the outputs of a second BCD counter 172 are tied to the ROM addresses in order that the correct coefficient is selected for the desired data. A third multiplexer 174 is used to select either the ROM coefficient sign or the additive compensation data's sign. The sign of the additive compensation data is selected only when its data is being compared to the clamp value.

The outputs of the ROM sign multiplexer 174 and the data sign multiplexer 168 are tied to the inputs of a exclusive-OR gate 176. The output of this gate is the Subtract-Add-Select (SAS) line to the arithmetic unit 36. If the data sign is identical to the ROM sign, the output of the gate is a logic 0 and an addition takes place. If the data sign is the complemented value of the ROM sign, the output of the gate is a logic "1" and subtraction is performed. The outputs of the sign and data multiplexers are also tied to the inputs of exclusive-OR gate 178. The output of this gate is ANDed by gate 180 with the accumulate clock pulse (ACC) from the timing and control. If the data bit is identical to its sign bit, the accumulate clock pulse is disabled. If the data bit is the complement of its sign, the accumulate clock is enabled. The output of AND gate 180 is OR'd by gate 182 with the shift right clock pulse (SRC). The output of OR gate 182 is the clock pulse that is transmitted to the arithmetic unit 36.

Figure 8:
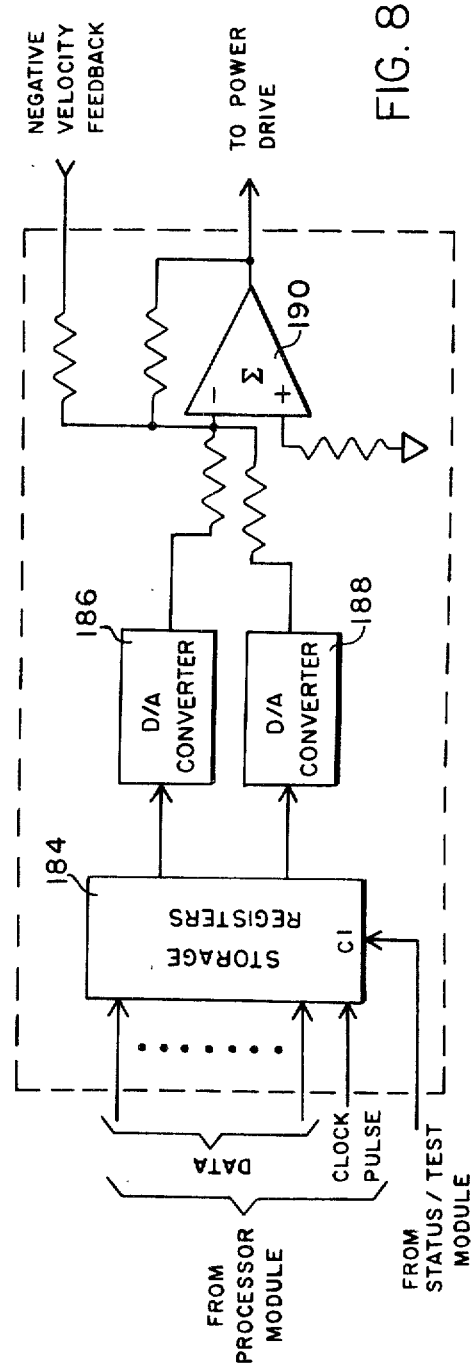
FIG. 8 is a network diagram of the analog output module of the present invention.

The analog output module shown in FIG. 8 contains six storage registers 184, two D/A converters 186 and 188, and one summing amplifier 190 for each axis to be controlled. The D/A converters 186 and 188 have, for example, 11-bit resolution and are directly CMOS compatible. The coding for the analog output module is sign/magnitude. That is all bits, including the sign bit, a logic 1 yield maximum positive voltage. All bits, excluding the sign bit, a logic 1 yield maximum positive voltage. The summing amplifier 190 is, for example, a frequency-compensated amplifier with short circuit protection. Storage registers 184 are required because the D/A converters do not have internal storage registers. Three of the storage registers are tied to the outputs of the arithmetic unit, and contain the additive compensation results. The other three registers are tied to the data buffer register 52 and contain either large signal control or small signal control calculation results. The clear line to the registers is tied to the status/test module 32. When any one of the axes being controlled is out of sync for a predetermined length of time, the storage registers are reset. This results in zero velocity orders being sent to all power drives under control.

Figure 9:
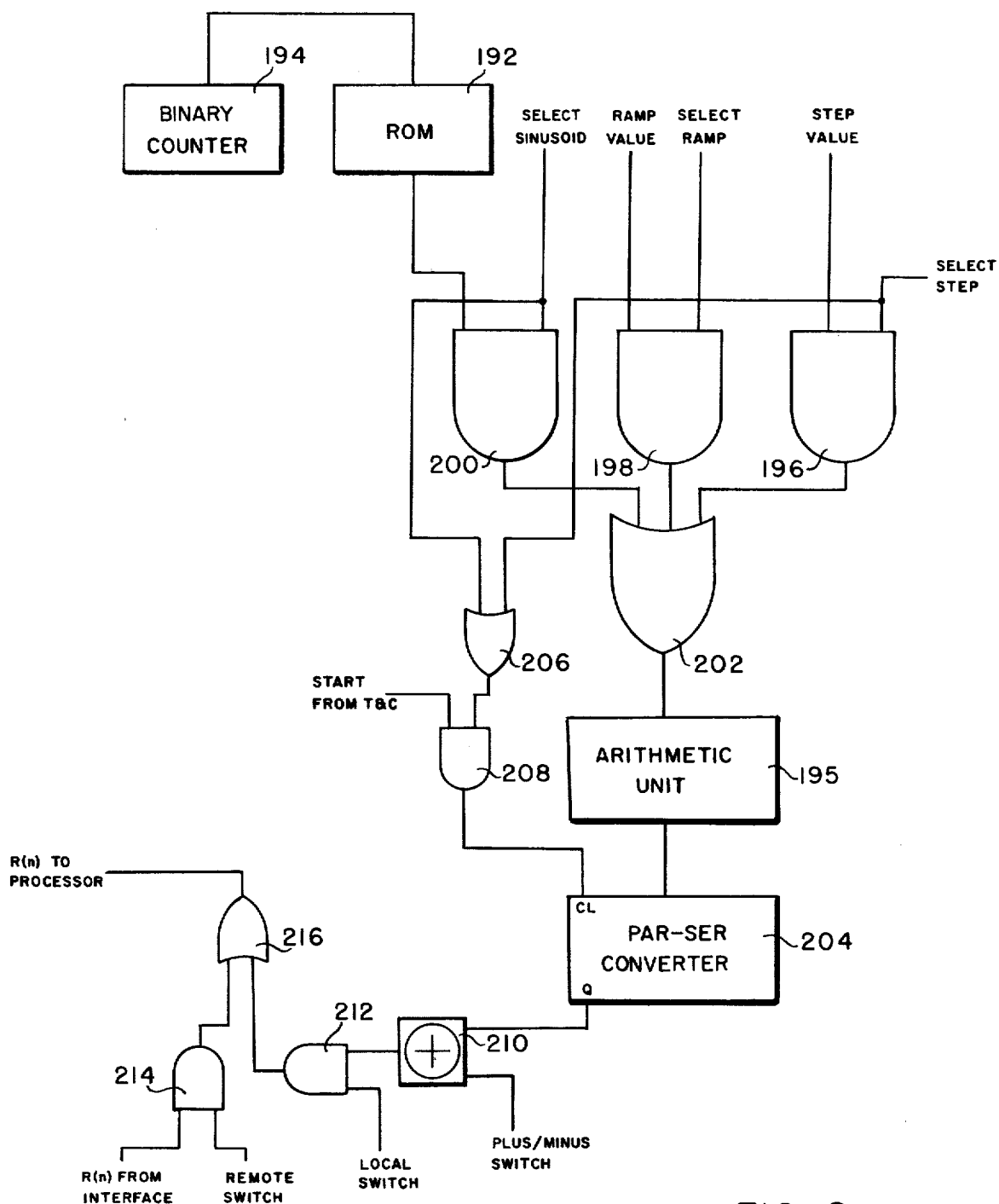
FIG. 9 is a network diagram of the function generator of the present invention.

The status/test module 32 monitors key system parameters and recognizes anomalies that occur in the controller modules. This module also generates "canned" input commands that are transmitted to the processor module 28 when the controller is placed in the local mode of operation. The function generator portion of 32 is illustrated in FIG. 9. Ramp, step, or sinusoidal type commands can be generated. The type of signal generated is determined by the setting of the front panel function switches (not shown). The frequency and period of the sinusoids are determined by the values that have been loaded in the ROM 192. Binary counter 194 is used to address the desired ROM memory location as the sinusoids are being generated. The function selected is tied to the input of a 16-bit adder 195, by AND gates 196, 198, and 200 and OR gate 202. The outputs of the adders are tied to the inputs of parallel/serial registers 204. If either a step of sinusoid is selected, the registers 204 are cleared at the beginning of every sample period by the input from OR gate 206 and AND 208. If a ramp is selected, the registers are not cleared and the function is allowed to increase with time. The serial output of the registers is tied to one of the inputs of exclusive OR gate 210. The other input or 210 is tied to the front panel plus/minus switch (not shown). The switch in the (+) position allows the two values to be generated. The complemented values of the input are generated if the switch is in the (−) position. The output of exclusive OR gate 210 is furnished as one of the inputs to AND gate 212. The other input to AND gate 212 is from the local switch (not shown) and is transmitted to the processor module in the local mode. The position order for the master computer is ANDed by AND 214 with the remote switch (not shown) and is transmitted to the processor module in the remote mode. This module may also contain four D/A converters (not shown) and a solid state display depicting the selected axis' actual position. The D/A converters may be used to obtain an analog representation of error, position command, and actual plant position.

Figure 10:
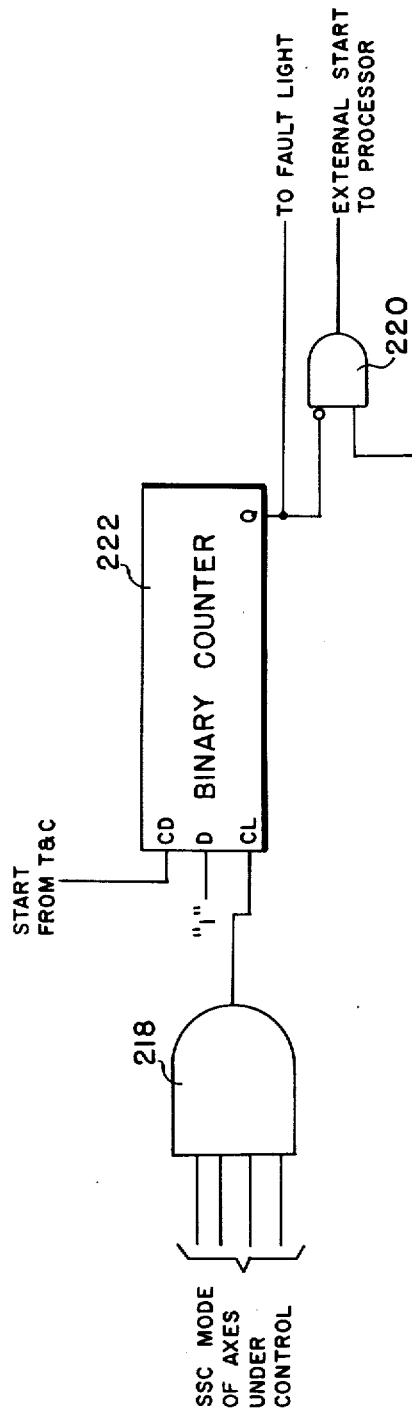
FIG. 10 is a network diagram of the status module of the present invention.

The status module portion of unit 32 illustrated in FIG. 10 continuously monitors the mode of all axis being controlled. AND gate 218 receives its inputs from the mode select converter 88 sync outputs. As long as all axes are in sync, the output of the AND gate 220 is a 1 and the counter 222 is clear. This allows the external start from the master computer to be transmitted to the processor module. As soon as one or more axes goes out of sync, the counter is allowed to start counting. After a predetermined length of time, typically 8 to 10 seconds, the output of the counter goes high. This causes the disabling of the external start from the master computer. Also, a fault light on the front panel may be lit (not shown) and the registers located on the analog output module are cleared.

Figure 11:
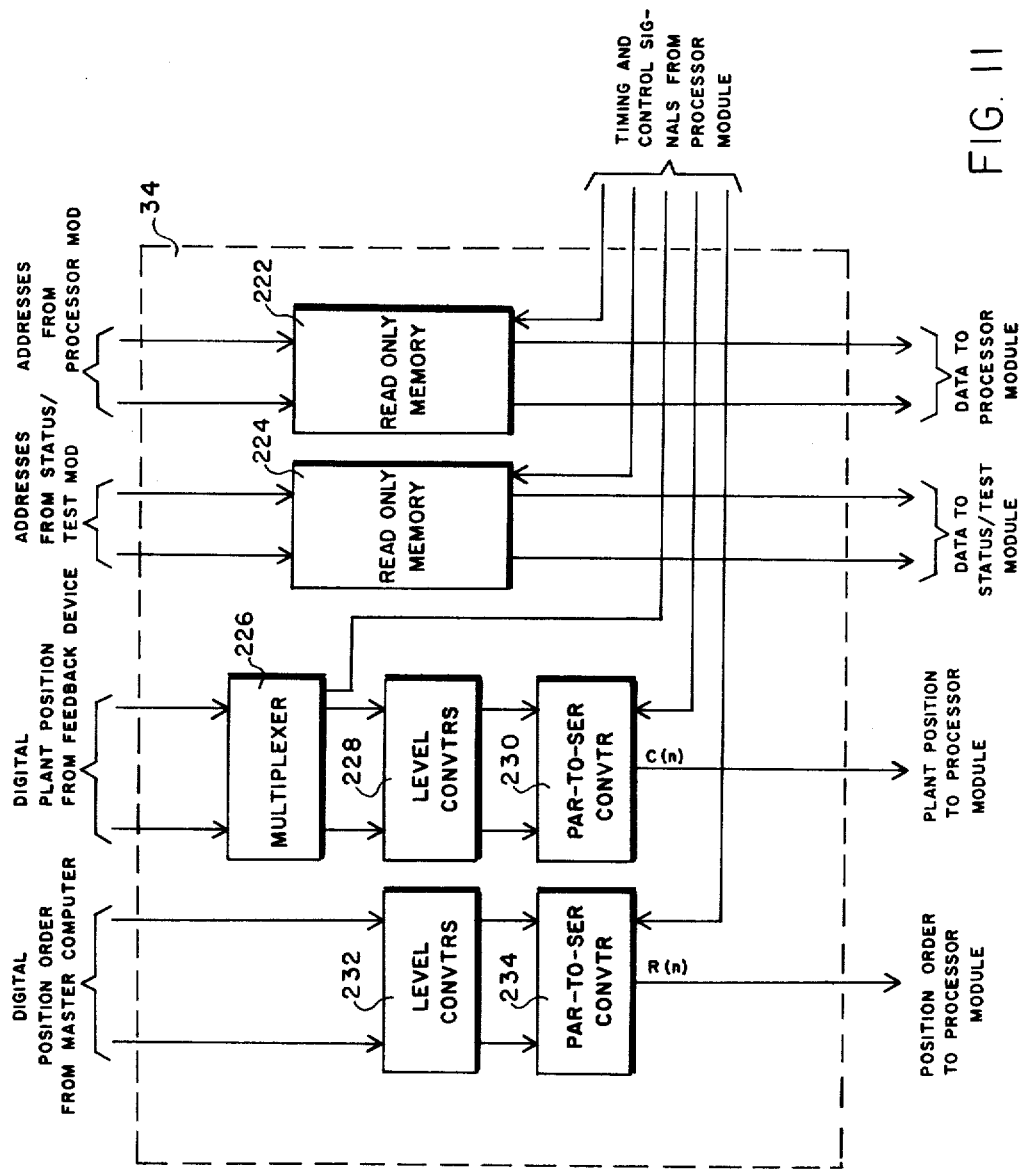
FIG. 11 is a network diagram of the coefficient/interface means of the present invention.
Figure 13A:
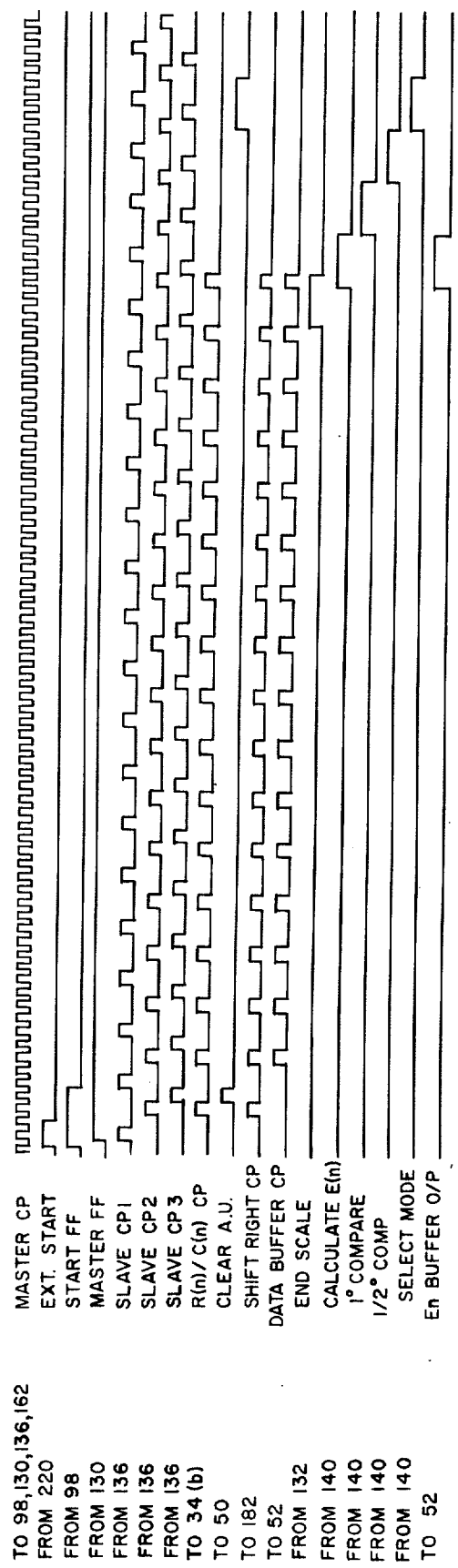
Figure 13B:
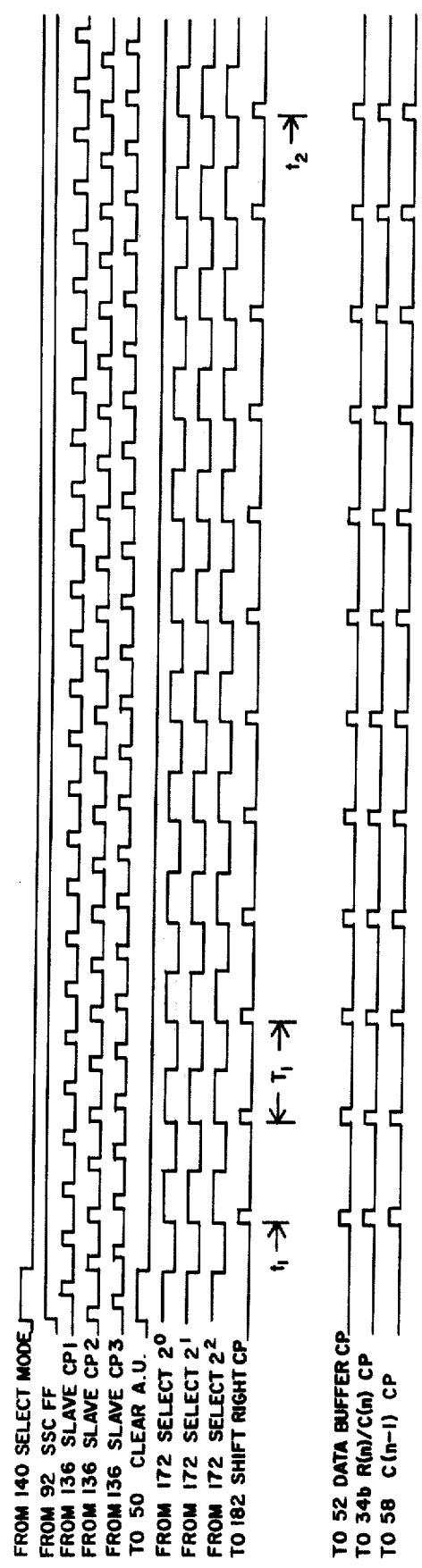
Figure 13C:
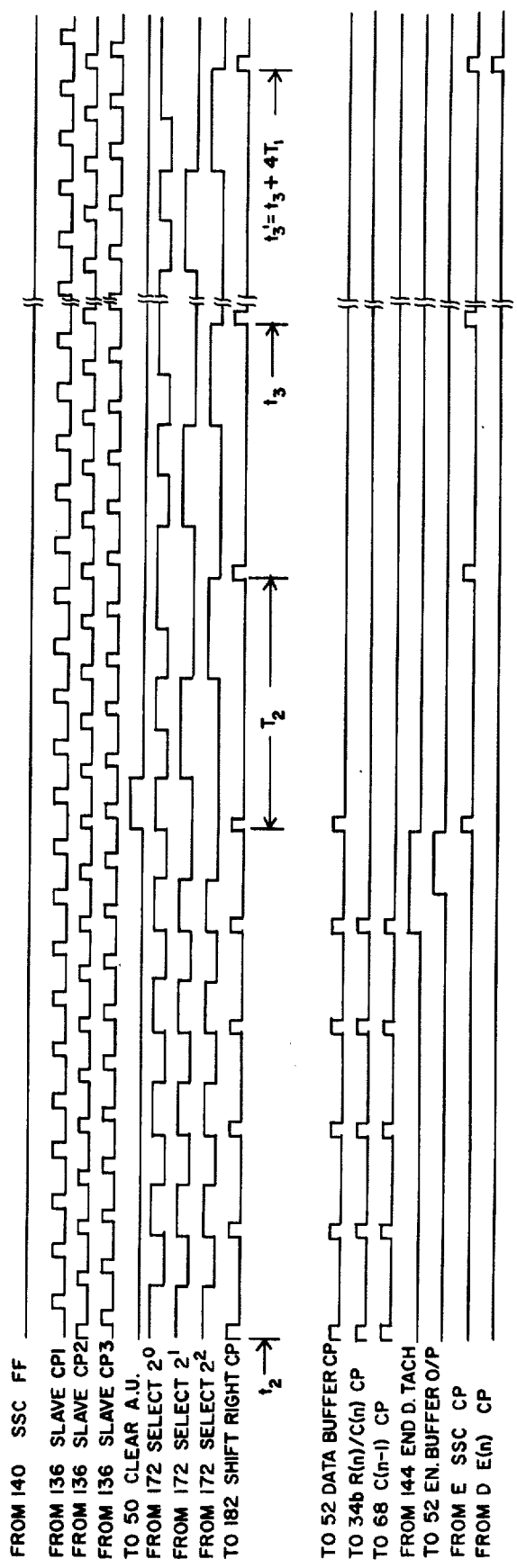
Figure 13D:
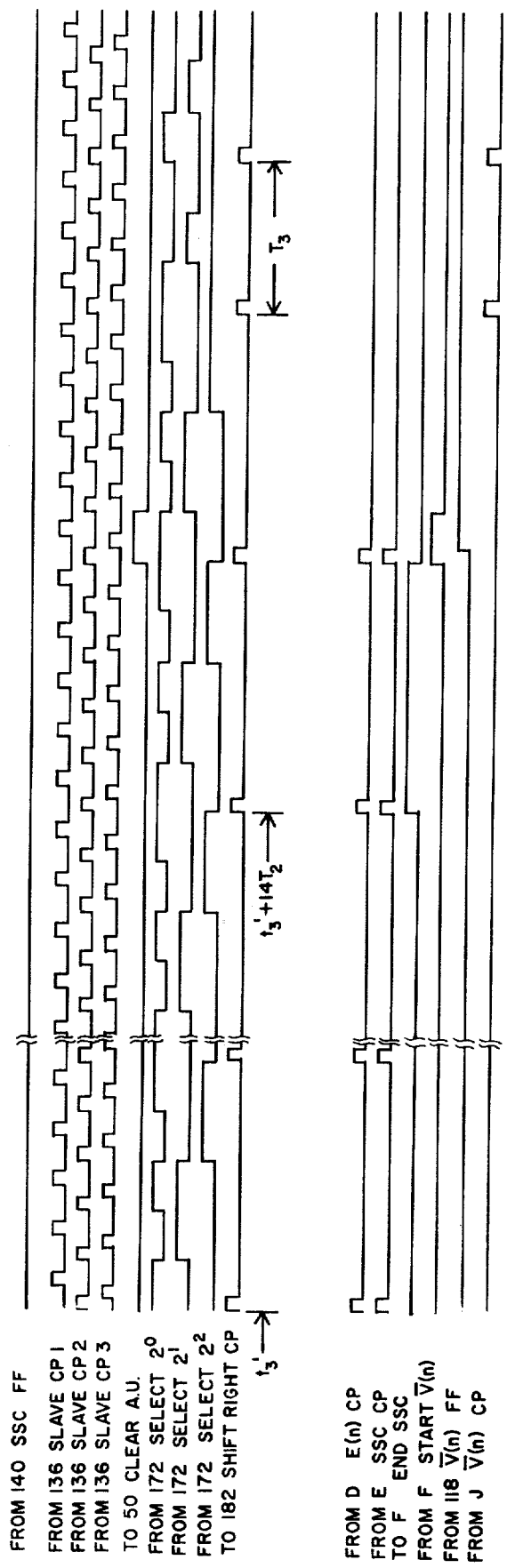
Figure 13E:
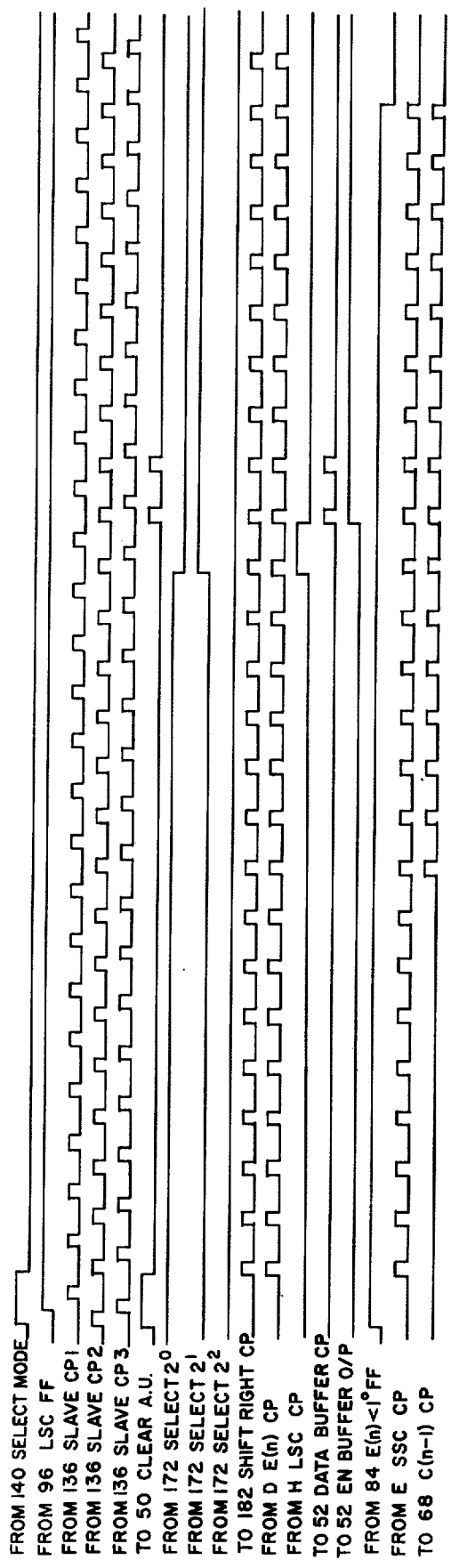
Figure 13F:
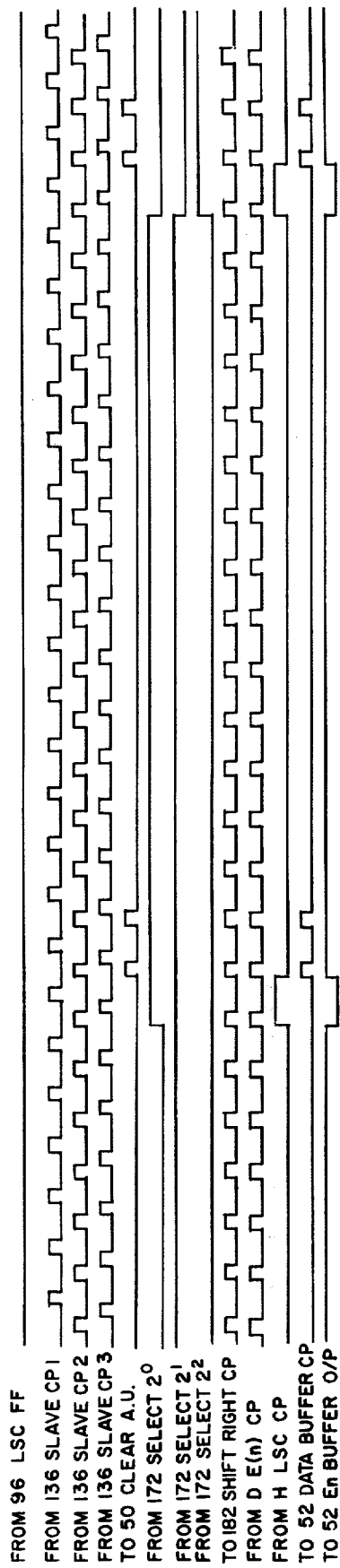
Figure 13H:
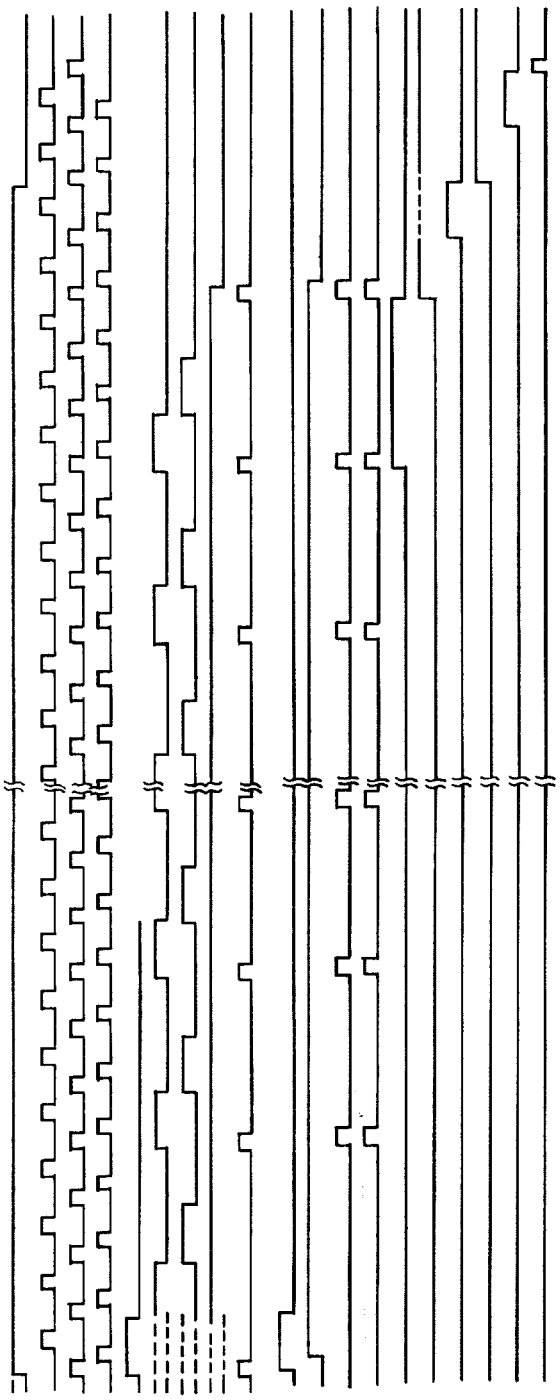

The coefficient/interface module 34 illustrated in detail in FIG. 11 contains five read only memories and all the circuitry required to interface the processor module with the position command from the master computer and the plant position from the feedback devices. Three of the ROM's 222 are used to store the data particular to the plant being controlled. The ROM's receive their address and enable output signals from the timing and control unit. Their outputs are used as inputs to the arithmetic unit 36. Each set of three ROM's is capable of holding data for up to four separate axes. Two ROM's 224 are required to hold the data needed for the sinusoids that are generated in the local mode of control described above. These ROM's receive their inputs from the binary counter 194 located in the function generator illustrated in FIG. 9. The outputs are sent to the sinusoid gating devices which are also located in the function generator.

The interfacing required for the plant position data may include multiplexers, level converters, and/or parallel/serial registers. The multiplexers 226 are needed because data is received from as many as four different axes. The outputs of the multiplexers may have to be tied to level converters 228, depending upon their compatability with CMOS logic levels. The parallel/serial register 230 holds the plant position data that is serially transmitted to the processor module. The interfacing required for the position command may include level converters 232 and/or parallel/serial registers 234.

Detailed timing diagrams are illustrated in FIGS. 13a through 13h. The notations in the margins denote either the source or destination of the pulse. Diagram 13b illustrates the timing relationship when small signal control has been selected. The select $2^0$, select $2^1$, select $2^2$ pulses denote the ROM addresses. Diagrams 13e, 13f, and 13g indicate the timing relationships for the large signal control mode. Diagram 13h indicates the timing relationship for the remaining calculations.

Obviously many modifications and variations of the present invention are possible in the light of the above teachings. It is therefore to be understood that within the scope of the appended claims the invention may be practiced otherwise than as specifically described.

What is claimed is:

1. A multiaxis power drive controller for a plant comprising:

interface means for receiving a digital plant position order from a master source, for receiving plant position feedback signals and for storing a plurality of predetermined constants;

arithmetic means connected to said interface means for performing addition, subtraction and multiplication operations and for outputting a digital velocity signal;

temporary storage means connected to said interface means and to said arithmetic means for storing the results of said operations of said arithmetic unit and for receiving digital information from said interface means;

mode select means connected to said temporary storage means for initiating the comparison of the error value $E(n)$, where $E(n)$ is the difference between said plant position order and said plant position feedback signal, with first and second predetermined conditions and for selecting first and second modes of operation in accordance with said comparison;

digital to analog conversion means connected to said arithmetic means for providing an analog velocity order to said power drive; and timing and control means for outputting timing signals to said interface means, said arithmetic means, said temporary storage means, said mode select means and to said digital to analog conversion means.

2. The controller of claim 1 wherein in response to selection of said first mode of operation by said mode select means, said timing and control means gates said interface means, said temporary storage means and said arithmetic means such that said arithmetic means outputs a digital velocity signal representative of the quantity $V_c(n) + \overline{V}(n)$ where $$V_c(n) = \{[C_4 E(n) + C_3) E(n) + C_2] E(n) + C_1\} E(n) + C_0$$

and $$\overline{V}(n) = K_1 R(n) - K_1 R(n-1) + K_2 \overline{V}(n-1)$$

where $C_0$, $C_1$, $C_2$, $C_3$, $C_4$, $K_1$, and $K_2$ are constants from said plurality of predetermined constants, $R(n)$ and $R(n-1)$ are present and past values, respectively, of said position order, and $\overline{V}(n)$ and $\overline{V}(n-1)$ are the present and past value, respectively, of the feedforward velocity signal $\overline{V}(n)$.

3. The controller of claim 2 wherein in response to selection of said second mode of operation by said mode select means, said timing and control means gates said interface means, said temporary storage means and said arithmetic means such that said arithmetic means outputs a digital velocity signal representative of $$\overline{V}(n) + \overline{E}(n)$$

where $$\overline{E}(n) = a_0 \hat{E}(n) + a_1 \hat{E}(n-1) + a_2 \hat{E}(n-2) + b_1 \overline{E}(n-1) + b_2 \overline{E}(n-2).$$

where $a_0, a_1, a_2, b_1,$ and $b_2$ are constants from said plurality of predetermined constants, $\hat{E}(n) = E(n) + \overline{C}(n)$ where $\overline{C}(n) = A\,[C(n) - C(n-1)]$ where A is a constant from said plurality of predetermined constants, $C(n)$ and $C(n-1)$ are present and past values, respectively, of plant position $\hat{E}(n-1)$ and $\hat{E}(n-2)$ are first and second past values, respectively, of $\hat{E}(n)$, and $\overline{E}(n-1)$ and $\overline{E}(n-2)$ are first and second past values, respectively, of $\overline{E}(n)$.

4. The controller of claim 1 wherein said timing and control means comprises:
first means for generating a series of clock pulses;
second means connected to said first means for initiating scaling of said position feedback signals;
third means connected to said second means for initiating operation of said mode select means;
fourth means connected to said third means for initiating said first and second modes of operations.

5. The controller of claim 4 wherein said mode select means comprises
an exclusive OR gate connected to said temporary storage means and to said arithmetic means;
a first flip-flop connected to said exclusive OR gate;
a serial-to-parallel converter;
an AND gate connected to said first flip-flop and to said serial-to-parallel converter;
and OR gate connected to said exclusive OR gate and to said AND gate;
second and third flip-flops connected to said OR gate.

6. The controller of claim 4 wherein said temporary storage means includes:
first storage means connected to said arithmetic means for storing present values of $E(n)$ and past values of $E(n)$; and
second storage means connected to said arithmetic unit for storing past values of said position order.

7. The controller of claim 6 wherein said interface means includes
read-only-memory means connected to said arithmetic means for storing said plurality of predetermined constants;
a first parallel-to-serial converter for receiving said plant position order; and
a second parallel-to-serial converter for receiving said plant position feedback signals.

* * * * *